UNITED STATES PATENT OFFICE.

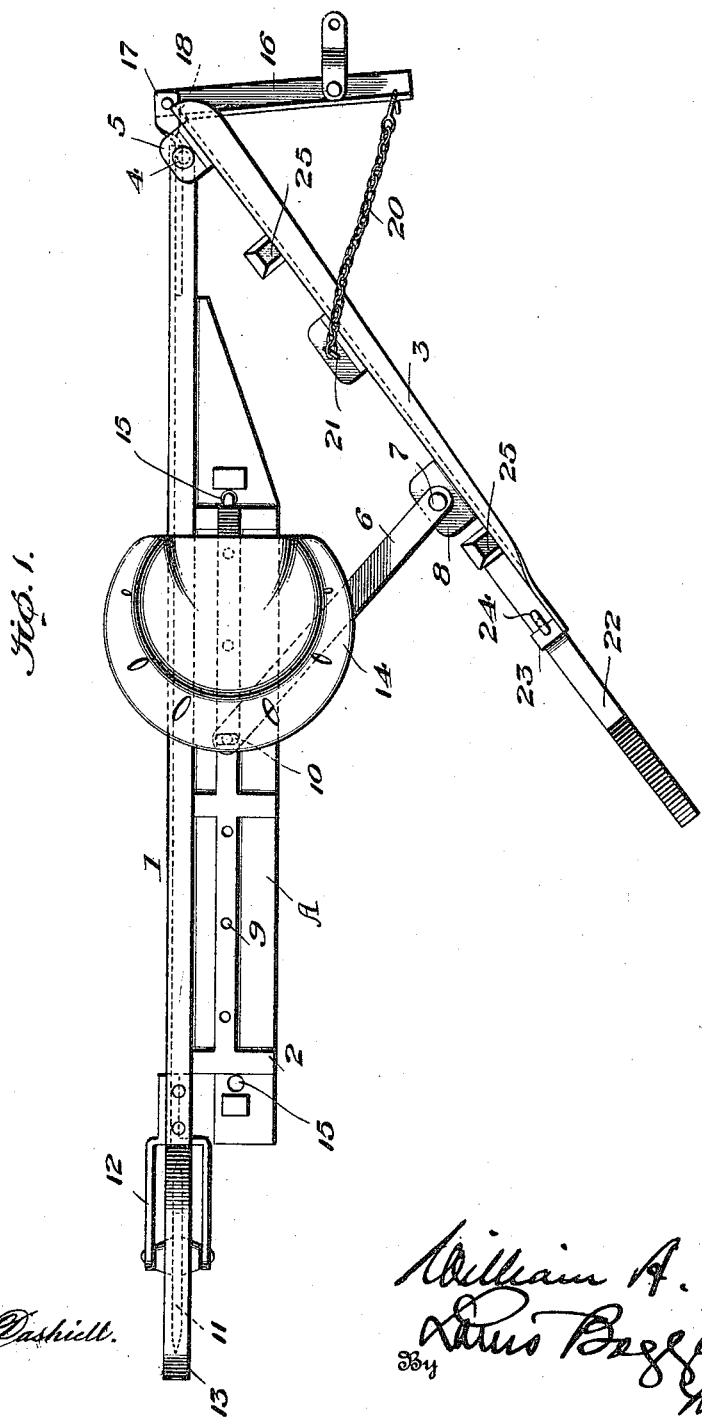

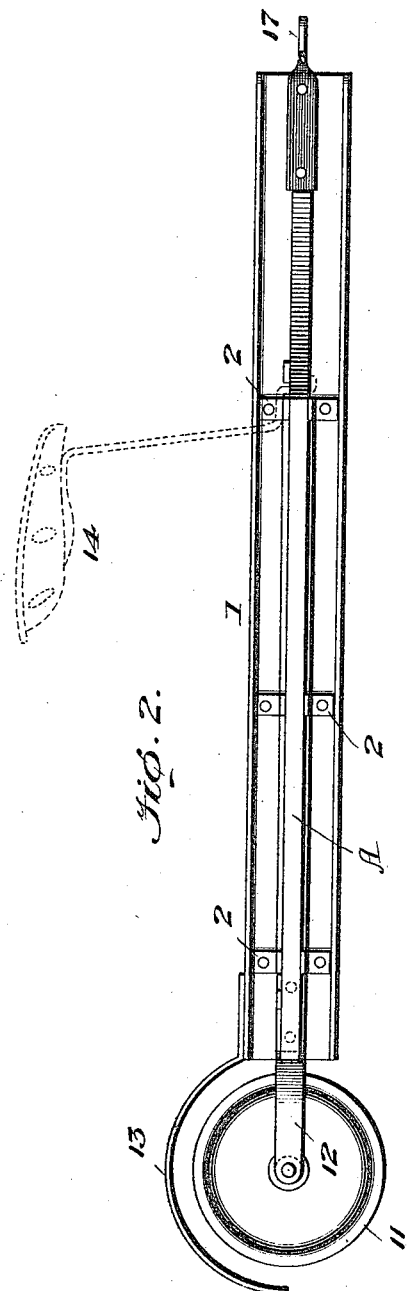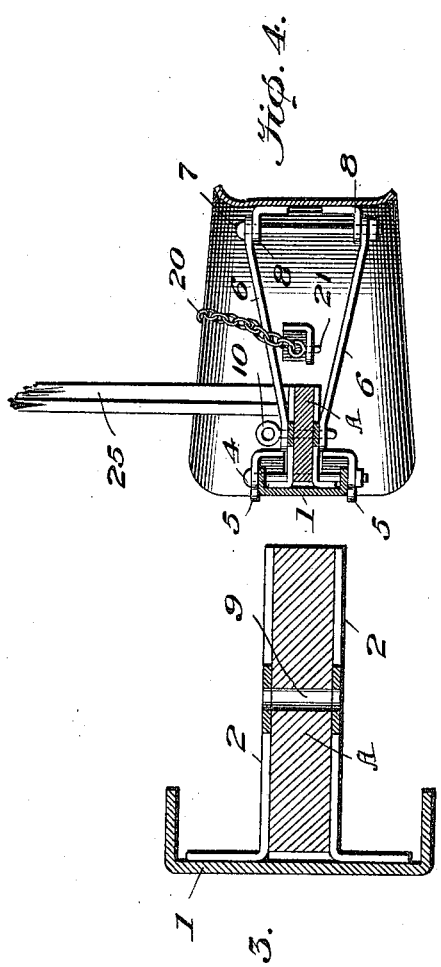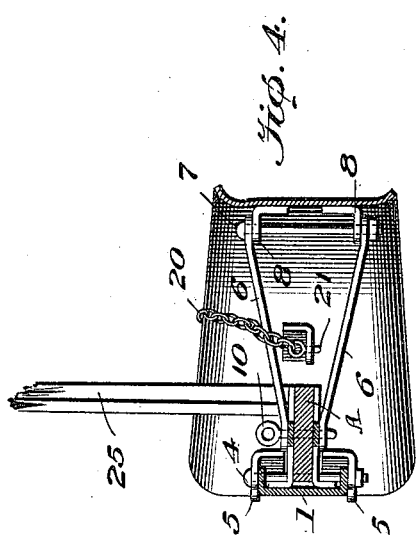

WILLIAM ALEXANDER STEELE, OF OWENSBORO, KENTUCKY.

GRADER AND DITCHER.

1,317,601.   Specification of Letters Patent.   Patented Sept. 30, 1919.

Application filed April 3, 1918. Serial No. 226,476.

*To all whom it may concern:*

Be it known that I, WILLIAM A. STEELE, a citizen of the United States of America, residing at Owensboro, in the county of Daviess and State of Kentucky, have invented certain new and useful Improvements in Graders and Ditchers, of which the following is a specification.

My invention relates to an improved grader and ditcher of the type in which a reversible blade is pivoted at the forward end of a runner beam or land side and the present invention consists in a runner beam or land side made of channel iron with a cutting blade pivoted at its extreme forward end just in front of the forward end of the runner beam or land side, together with braces for regulating the angle of the two.

This invention also consists in the foregoing in connection with a foot-board secured within the channel iron and having a colter approximately in direct alinement with the runner beam or channel iron.

This present invention further consists in the foregoing in connection with means at the front and rear of the foot-board to receive a removable seat.

This invention still further consists in certain novel features of construction and combination of parts which will be hereinafter described and pointed out in the claims.

In the accompanying drawings:—

Figure 1 is a plan view.

Fig. 2 is an inside view of the runner beam or land side;

Fig. 3 is a transverse section through the latter;

Fig. 4 is a view in rear of the braces.

The numeral 1, represents the runner beam or land side; this is preferably made of one strip of channel iron and it has a foot-board A secured at its inner edge along the center of the latter and on the inner side where it serves the several functions of a platform for the driver to stand on, a strengthening or reinforcing rib practically throughout the channel iron runner beam or land side for giving strength to an otherwise light all metal construction, it affords adjustable means for the braces which determine the angle between the runner beam or land side and the cutting blade and it furnishes support for the removable seat.

The foot-board A is preferably held in place by a plurality of brackets 2, secured within the channel iron runner beam or land side and receiving the foot-board which is riveted or otherwise secured thereto.

The numeral 3, represents the reversible cutting blade. This is pivoted at its extreme forward end by means of a bolt 4, extending through brackets 5, on the reversible cutting blade and through the forward ends of the flanges of the channel bar so that the extreme forward end of the cutting blade terminates immediately in front of the runner beam or land side.

Two braces 6, extend from a pin 7, extending through brackets 8, on the inner face of the cutting blade to some point on the foot-board, there being a plurality of holes 9, to receive a pin 10, for holding the ends of the braces and adjusting the angle of the runner beam or land side and the cutting blade with respect to each other.

Colter 11, is mounted to turn in the bearing 12, immediately in line with and in rear of the runner beam or land side forming virtually an extension of the latter and a guard 13 extends over it.

A removable seat 14, is insertible and removable from the foot-board and a hole or socket 15 is formed at either end thereof and if desired at intermediate points on the foot-board to receive it.

An angle iron hitch 16, is pivoted at one end to a lug 17 on the extreme forward end of the runner beam or land side and to this the draft animals are hitched and a clearance space 18 receives this angle iron hitch bar. A chain 20, extends from the free end of the hitch bar over the blade to a staple 21, on the rear thereof. The usual extension member 22, extends back from the rear end of the cutting blade where it is held removably by the strap 23 and a removable pin 24. Posts or handles 25 extend upwardly from the cutting blade where they are removably held on the rear of the cutting blade.

This improved grader and ditcher consists of few parts; mainly, of more or less light and thin metal assembled in such a way that they may be taken apart for shipping or folded into small compass; at the same time these parts are strong and effective in the work required.

I claim:—

1. The combination of a runner beam or land side and a reversible cutting blade pivoted at its forward end to the extreme forward end of the runner beam or land side and projecting slightly in front thereof, a hitch bar pivoted at one end directly to the forward end of the runner beam or land side and a flexible connection extending from its free end over the blade and fastened at the rear thereof.

2. The combination in a grader and ditcher of a channel iron, runner beam or land side, a cutting blade pivoted thereto, a foot-board secured to the inner face of the runner beam or land side between the flanges affording support for the driver and a reinforcing rib or brace for the runner beam or land side, said foot-board having holes or sockets, a seat removably inserted in one of said holes or sockets.

3. The combination in a grader and ditcher of a channel iron runner beam or land side, a cutting blade pivoted thereto, a foot-board secured to the inner face of the runner beam or land side between the flanges affording support for the driver and a reinforcing rib or brace for the runner beam or land side, said foot-board having holes or sockets, a seat removably inserted in one of said holes or sockets, braces pivoted to the cutting blade, a removable pin for attaching one end of said braces to the foot-board, a foot-board having a plurality of holes to receive said pin.

In testimony whereof I affix my signature.

WILLIAM ALEXANDER STEELE.

Copies of this patent may be obtained for five cents each, by addressing the "Commissioner of Patents, Washington, D. C."